March 19, 1963   M. KESSLER   3,081,992
PLASTIC SPRING

Filed July 12, 1961   2 Sheets-Sheet 1

INVENTOR
Milton Kessler

BY  *Max L. Libman*

ATTORNEY

March 19, 1963 M. KESSLER 3,081,992
PLASTIC SPRING
Filed July 12, 1961 2 Sheets-Sheet 2
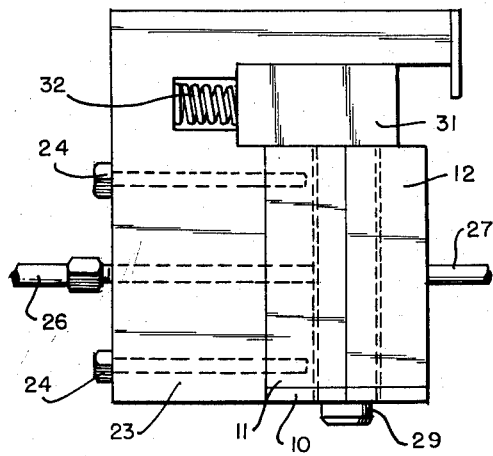
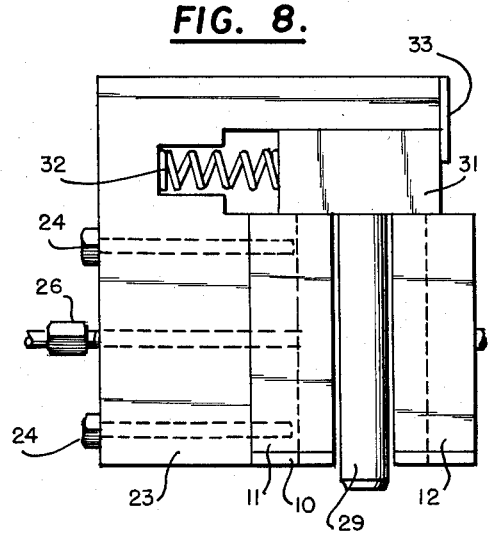
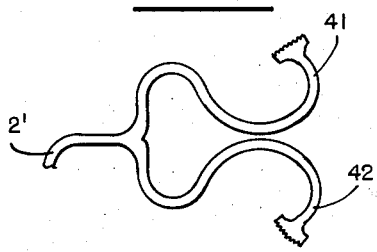
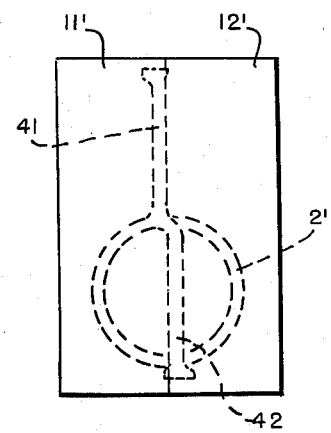
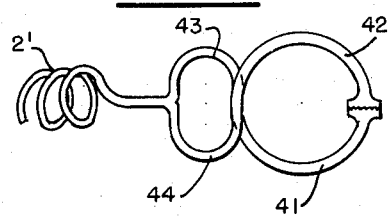
INVENTOR
Milton Kessler
BY *Max L. Libman*
ATTORNEY

United States Patent Office 3,081,992
Patented Mar. 19, 1963

3,081,992
PLASTIC SPRING
Milton Kessler, 4535 Grove Drive, Youngstown, Ohio
Filed July 12, 1961, Ser. No. 123,486
2 Claims. (Cl. 267—1)

This invention relates to a plastic spring unit and to a method of making same.

There is a considerable need for plastic spring elements for use in many applications, such as toys, as replacements for presently-used metal springs in situations where rusting, resistance to corrosive fluids, etc., are factors. For use in toys, plastic springs or coils must be above all inexpensive, since the market for such items is almost directly proportional to the cheapness with which they can be made. For use as mechanical spring elements, more expensive plastic must be used such as Delron, in order to secure satisfactory mechanical properties of elasticity, stiffness, etc. However, the cost is still a primary factor, and it is therefore important that the spring be produced by a low-cost economical method. Present commercial techniques for molding springs involve expensive engraving of dies by laborious hand methods, which greatly increase the cost of the product.

It is therefore a major object of the invention to provide a simple and inexpensive spring unit, and also a method for fabricating the dies and molds used to make such springs, and to provide a method whereby springs can be rapidly and economically manufactured by the proper use of such dies.

Plastic springs used for toy purposes, such as imitation cords for small toy telephones are commonly attached by hand methods such as stapling, nailing, etc., to the toys with which they are used. This is laborious, time consuming, and therefore expensive. It is a major object of the invention to provide plastic cords having simple attachment means molded integrally therewith of the same plastic material as the coil itself, whereby the coil can be readily attached to the equipment with which it is used, as by the simple provision of a suitable hole or preparation in the equipment through which the end of the cord can be inserted, whereby it locks itself into place without treatment, or by molding clips on the coil ends. The first may be accomplished by the provision of suitable barb members at the end of the cord, as will be explained below.

The specific nature of the invention as well as other objects and advantages thereof will clearly appear from a description of a preferred embodiment as shown in the accompanying drawings, in which:

FIG. 7 is a schematic view of a molding press using the die elements of FIGS. 2–6 in the plastic molding position;

FIG. 8 is a view similar to FIG. 7, showing the die parts in the coil ejection position;

FIG. 10 shows a molded clip termination instead of the barb as it comes out of the die;

FIG. 11 shows the molded clip bent into its position of use; and

FIG. 12 is an end view of a die for molding the unitary spring and clip.

Figure 1:
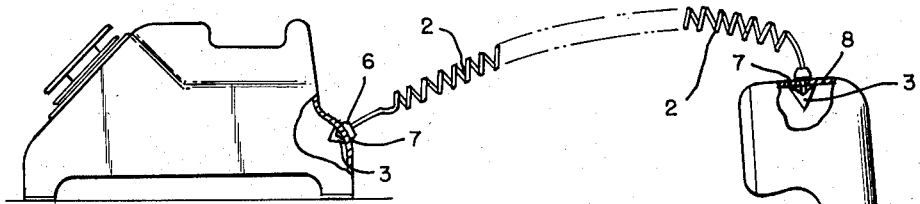
FIG. 1 is a view of a spring unit according to the invention, used as a toy telephone cord.
Figure 1A:
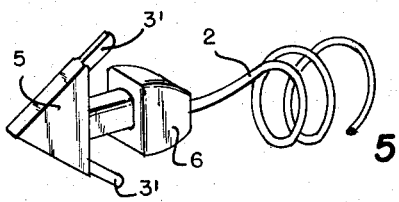
FIG. 1A is a drawing of a part of a cord made according to the invention, showing the detailed structure of a preferred barb construction.
Figure 4:
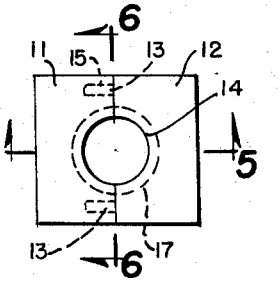
FIG. 4 is a view similar to FIG. 2, showing the die block at a further stage of preparation.

Referring to FIG. 1, the plastic coil is in usual helical form having a suitable number of turns 2. At each end of the coil, a barb 3 is provided having two thin arrow-shaped barb members 3′ extending from a more solid central core 5. A stop member 6 is provided, which is, in effect, merely an enlargement of the plastic filament 2 forming the coil member. A very common use for plastic coil members of this type is to simulate the extensible telephone cord in a toy telephone, and the common method of assembly is merely to staple the ends of the coil 2 to a suitable portion of the telephone base and of the toy hand set respectively. The present improved construction permits the assembly to be made more simply merely by providing an aperture 7 in a suitable portion 8 of the object to which the coil is to be attached, and the attachment is simply accomplished by thrusting the barbs through the aperture, the thin blades 3′ being sufficiently flexible to deform and pass through the aperture, after which they regain their normal shape and configuration and engage the opposite side of the wall portion 8 to firmly attach the cord in place. It will be apparent that this greatly reduces the cost of assembly.

Figure 2:
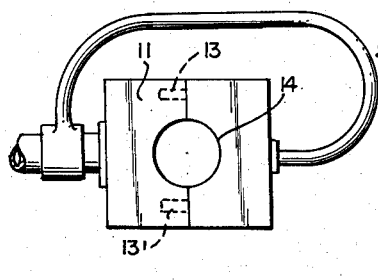
FIG. 2 is an end view of a die block showing an initial stage of preparing same.
Figure 6:
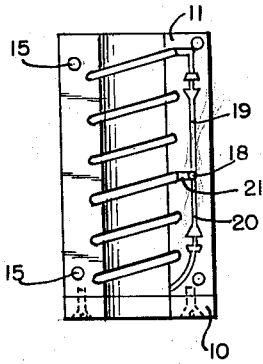
FIG. 6 is a view taken on line 6—6 of FIG. 4, showing a completed stationary half of the die.
Figure 3:
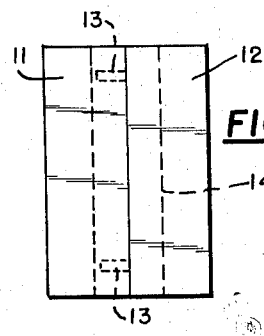
FIG. 3 is a side view of the block shown in FIG. 2.
Figure 5:
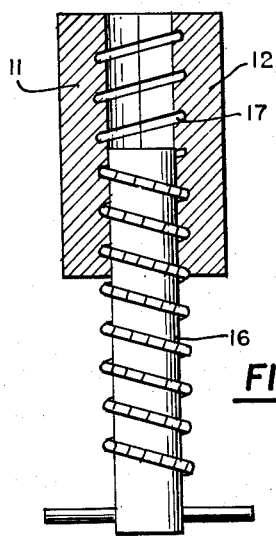
FIG. 5 is a view taken on line 5—5 of FIG. 4, with the addition of a threading tool partly inserted to show the manner of making the coil grooves.

A plastic spring of the above type would not be commercially feasible unless it could be economically produced. The manner in which this is done according to my invention will now be described. Referring to FIG. 2, two facing die blocks are assembled with opposite faces mating, in a vise or clamp. Preferably, the location of the blocks with respect to each other is definitely fixed by means of locating pins 13 protruding from block 12 into suitably located corresponding recesses in block 11. A hole 14 is then bored through the block assembly at their interface, in the position shown, the diameter of the hole corresponding to the desired internal diameter of the spring or coil to be produced. With the blocks still firmly clamped together, this hole is then tapped with any suitable tapping tool 16 (FIG. 5) to produce a helical groove 17, the pitch and depth of the groove corresponding to the pitch and thickness of the coil 2 which is to be produced. This can be accomplished simply in standard fashion by passing several successive tapping tools each larger than the last through the aperture until the desired size has been attained. This forms the main die portion for the coil 2. Instead of a tapping tool, a lathe boring tool or other known technique could be used. The two die blocks are now separated and the barbed portions are cut into one or both of the die blocks shown in FIG. 6, which shows block 11 destined to be the staitonary die block. An aperture 18 is drilled into the block for admission of plastic and suitable sprues 19, 20, and 21 are cut into the block for the admission of plastic, in this case, to the two ends and center of the coil. An end block 10 is then fixed to the end of each die block, to terminate the helical groove. Tie block 11 is then fastened to the stationary portion 23 of a plastic molding press in any suitable way, as by bolts 24, and a suitable feed tube 26 is attached for feeding plastic in the molten condition to the die. The mechanism for doing this is conventional and will not be described. Die block 12 is attached to the movable portion of the press represented by plunger rod 27, which can be reciprocated to alternately engage the two die block faces as shown in FIG. 7 and to separate them as shown in FIG. 8. A cylindrical rod 29, of the same diameter as hole 14, is fixed to a sliding block 31, so that in the position shown in FIG. 7, it extends through the aperture 14 in the two abutting die blocks, thus filling all of the aperture, leaving only the helical groove 17 to be filled by plastic material introduced through aperture 18 in die block 11. Block 31 is urged by spring 32 to the right as shown in FIG. 7, but when the die blocks 12 and 11 are in the position shown in FIG. 7, rod 29 prevents the die block from moving. In this position, the hot plastic is inserted thorugh the tube 26 until all of the vacant spaces are filled with plastic, thus forming the coil of FIG. 1. The temperature and pressure conditions, as known in this art, are such that the plastic cord is formed almost instantly, in a condition in which it may be almost immediately moved. However, with some plastic materials, and particularly where superior mechanical properties are desired, it may be desirable to retain the coil in the die for a short while under suitable conditions of temperature and pressure until the desired mechanical properties are attained.

After the coil is thus formed in the die, it must be removed. This is accomplished by withdrawing the plunger 27 to the right, which carries die block 12 to the position shown in FIG. 8. This releases the pressure upon rod 29, allowing its carrying block 31 to move to the right under the action of spring 32, until block 31 engages stop 33 in the position shown in FIG. 8. The molded spring will then be held on rod 29, from which it can be readily ejected, either manually, or by suitable mechanism known in the art. After this, die block 12 is moved back into the position shown in FIG. 7, and the entire cycle is repeated.

Figure 9:
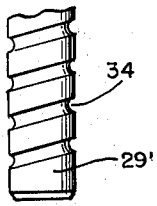
FIG. 9 is a view of a modified center die rod.

The above process produces a spring having a cylindrical inner surface, since it conforms to the exterior surface of rod 29. This is satisfactory for most purposes, but it will be apparent that if it is desired to have the cross section of the filament of spring 2 circular in shape, this can be readily achieved by turning a corresponding groove 34 in the surface of rod 29 as shown in FIG. 9, the groove 34 being so dimensioned as to mate with the groove 17. This can be readily done on any standard lathe, and involves no particular difficulty. However, it does require a closer fitting of the rod to the two die blocks 11 and 12, and is usually not needed, except where appearance is a factor.

Instead of the barbed ends, various other useful forms of attachment means may be provided. One such device is illustrated in FIGS. 10–12, which show the manner of forming an integral plastic clip at the ends of the spring. FIG. 10 shows the shape of the clip as it emerges from the die. The two clip arms 41 and 42 are then crossed over by hand into the configuration of FIG. 11, where the ends of these arms press against each other to form the clip surface. This can be used for holding a napkin or a bib around a child's neck, worn as a closure device with sweaters and other light clothing, and has a variety of uses. It will be noted that when the clip arms are folded into the functional relation shown in FIG. 11, finger pressure on curved portions 43 and 44, squeezing these portions together, will open the clip jaws for convenient use. FIG. 12 shows an end view of a typical die configuration, showing the manner in which one clip arm 41 is formed in the face of member 11' of the die block, while the other clip arm 42 is formed in the other die face 12'. If desired, both clip arms could be formed in the same die face, but then they would both lie in the same plane, instead of being slightly offset, which is desirable for some forms of clip configuration. In this manner, the entire unit can be made so cheaply that it is feasible to use it as a give-away item with packaged goods such as cereals, etc.

It will be apparent that the above method enables a coil of any size, thickness and pitch to be readily made by means of standard tools, without requiring the highest skill of the die maker for the major helical portion, ordinarily considered the most difficult portion of a die for this purpose. This enables plastic springs to be made in a large variety of sizes for any purpose at a fraction of the cost required by conventional methods.

It will be apparent that the embodiments shown are only exemplary and that various modifications can be made in construction and arrangement within the scope of the invention as defined in the appended claims.

I claim:

1. Homogeneous one-piece plastic unit comprising a flexible and extensible plastic coil spring and integral fastening means at at least one end thereof, said spring comprising a coiled filament of plastic material, said fastening means comprising an enlargement of the same plastic material as the spring near an end of said filament to serve as a stop, a reduced portion beyond said enlargement, and integral self-contained engagement means on said end of said reduced portion for fastening the unit to another object without the use of tools, said engagement means being a barbed portion permitting easy insertion into an aperture of suitable size to prevent withdrawal of the barbed portion, said barbed portion comprising a central core of substantial thickness extending from said reduced portion to the end of the unit, and at least one thin spline extending radially from said core in the form of a barb element which is very flexible compared with said core.

2. The invention according to claim 1, there being at least one other thin flexible spline extending from said enlargement in a different radial direction from the first-named spline.

References Cited in the file of this patent

UNITED STATES PATENTS

| 1,519,854 | Lockwood | Dec. 16, 1924 |
| 2,310,080 | Hill | Feb. 2, 1943 |
| 2,467,227 | Potter et al. | Apr. 12, 1949 |
| 2,696,023 | Stott | Dec. 7, 1954 |
| 2,812,936 | Setz | Nov. 12, 1957 |
| 2,903,242 | Bodine | Sept. 8, 1959 |
| 2,991,524 | Dobrikin | July 11, 1961 |

FOREIGN PATENTS

| 983,686 | France | Feb. 14, 1951 |
| 1,177,959 | France | Dec. 8, 1958 |